July 13, 1954    O. MATHESON    2,683,608
COMBINATION SNOW AND ROAD VEHICLE
Filed April 20, 1951    2 Sheets-Sheet 2
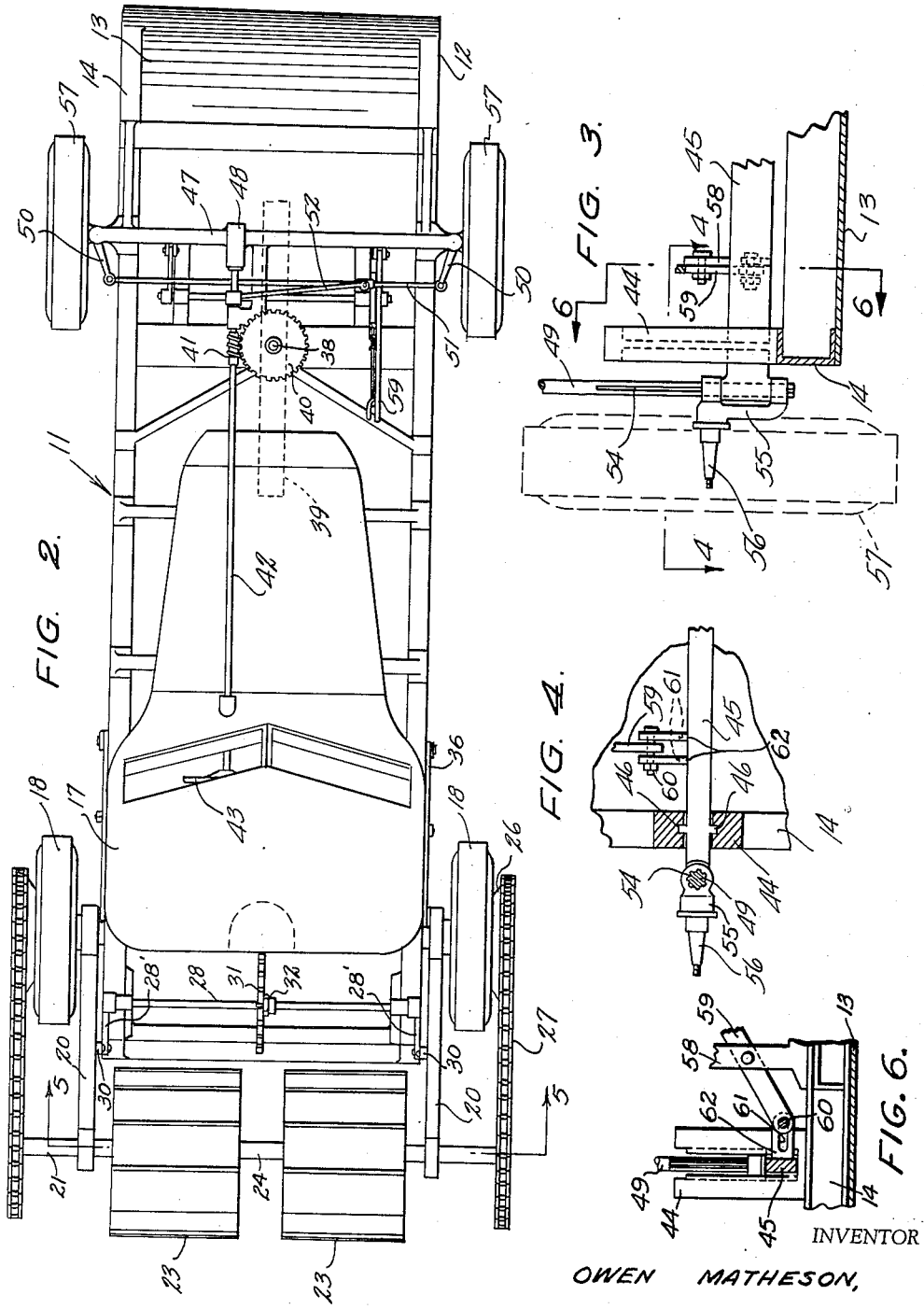
INVENTOR
OWEN MATHESON,
BY
McMorrow, Berman + Davidson
ATTORNEYS.

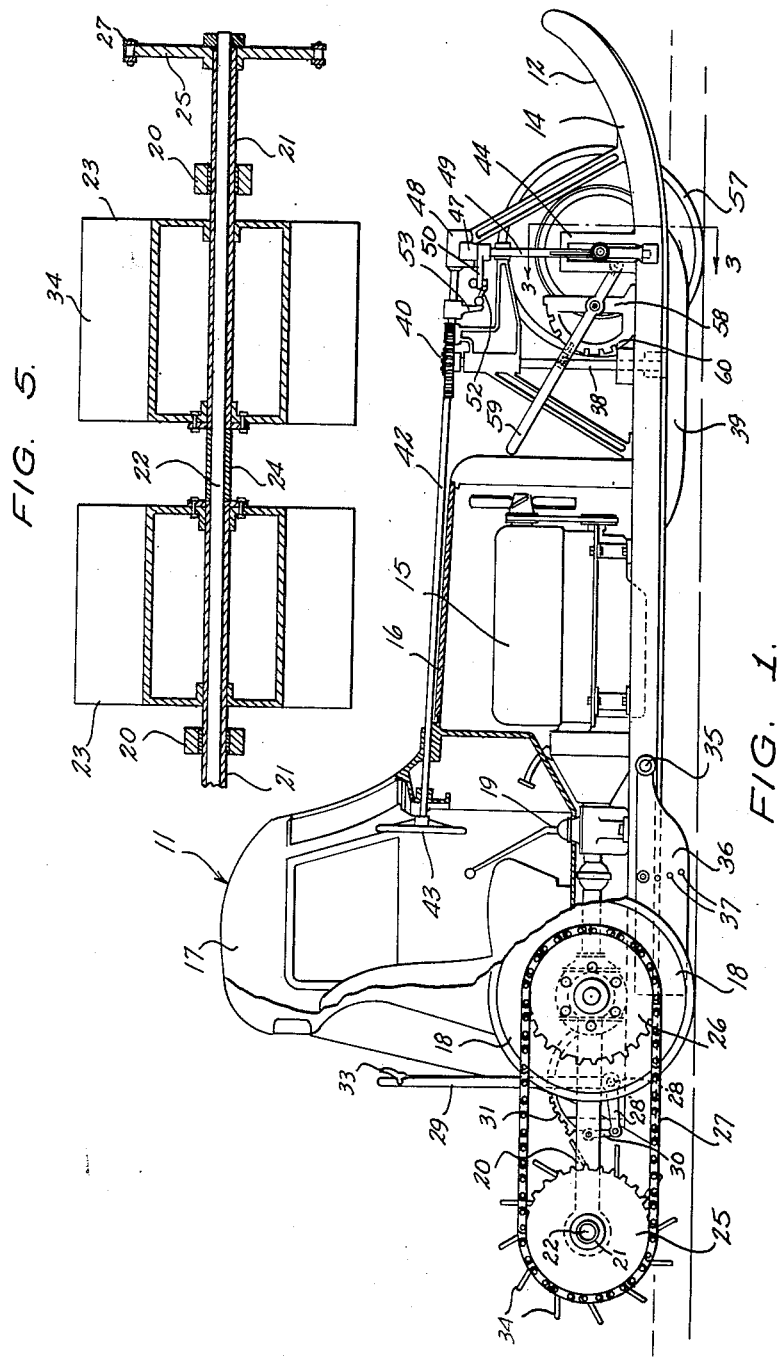
July 13, 1954 — O. MATHESON — 2,683,608
COMBINATION SNOW AND ROAD VEHICLE
Filed April 20, 1951 — 2 Sheets-Sheet 1
INVENTOR
OWEN MATHESON,
BY
ATTORNEYS.

Patented July 13, 1954

2,683,608

UNITED STATES PATENT OFFICE 2,683,608

COMBINATION SNOW AND ROAD VEHICLE

Owen Matheson, Bryce Canyon, Utah

Application April 20, 1951, Serial No. 222,057

3 Claims. (Cl. 280—9)

1

This invention relates to motor vehicles, and more particularly to a combination snow and road vehicle.

A main object of the invention is to provide a novel and improved motor vehicle which may be employed either as a road vehicle or as a snow vehicle, the improved vehicle being simple in construction, being easy to operate, and being readily convertible for use on snow or for travel on roads.

A further object of the invention is to provide an improved combination snow and road vehicle which involves relatively inexpensive components, which is rugged in construction, which is easily steered, and which is relatively compact in size.

Further objects and advantages of the invention will become apparent from the following description and claims, and from the accompanying drawings, wherein:

Figure 1 is a fragmentary side elevational view, partly in longitudinal cross section, of an improved combination snow and road vehicle, constructed in accordance with the present invention.

Figure 2 is a top plan view of the vehicle shown in Figure 1.

Figure 3 is an enlarged cross sectional detail view taken on the line 3—3 of Figure 1.

Figure 4 is an enlarged cross sectional detail view taken on the line 4—4 of Figure 3.

Figure 5 is an enlarged cross sectional detail view taken on the line 5—5 of Figure 2.

Figure 6 is a sectional view taken on the line 6—6 of Figure 3.

Referring to the drawings, the vehicle is designated generally at 11 and comprises a toboggan-shaped main body 12 having the sheet metal bottom wall 13 and the channel-shaped, upstanding periphery 14, said body being curved upwardly at its forward portion similar to a toboggan. Mounted on the intermediate portion of the body 12 is the internal combustion engine 15 which may be enclosed in a suitable housing 16, such as a conventional motor vehicle hood. The driver's cab is shown at 17, and is rearwardly located adjacent the engine 15, as shown. Mounted on the rear portion of the body 12 is a conventional rear wheel assembly, as employed in motor vehicles, said assembly including the rear wheels 18, 18 which are drivingly connected in a conventional manner to the motor 15 through the transmission 19. Designated at 20, 20 are respective rearwardly extending longitudinal bar members which are pivoted for vertical movement to the axle housings of the rear wheels 18, 18. Journaled in the rear ends of the bar members 20, 20 are the respective transverse sleeve members 21, 21. Extending through said sleeve members and being freely rotatable therein is a transverse shaft 22. Secured on the inner end portion of each sleeve member is a snow paddle wheel 23, the inner ends of the sleeve members 21, 21 being spaced apart by a spacer sleeve 24 mounted on the shaft 22 between the inner ends of said sleeve members 21, 21. Secured on the outer end of each sleeve member 21 is a sprocket wheel 25, the respective sprocket wheels 25 being coupled to sprocket wheels 26 secured on the road wheels 18 by respective sprocket chains 27, as shown in Figures 1 and 2. From Figures 1 and 2 it will be readily apparent that the sprocket chains 27 transmit torque to the respective snow paddle wheels 23 to cause said paddle wheels to rotate in the same directions as the respective road wheels 18, 18, and to be rotatable independently of one another in the same manner as the road wheels 18, 18 are rotatable independently of each other by the provision of the conventional differential mechanism which is included in the rear wheel assembly.

Rotatably mounted on the rear end portion of body 12 is a transverse shaft 28 having secured to its intermediate portion the upstanding lever 29. Rigidly secured to the ends of the shaft 28 are the respective arms 28', 28', said arms being connected to the respective longitudinal bar members 20, 20 by link bars 30. As shown in Figure 1, the longitudinal bar members 20 may be rotated clockwise, as viewed in Figure 1, responsive to clockwise rotation of the lever 29, whereby the snow paddle wheels 23, 23 may be elevated a substantial distance above ground level. It is to be noted that when the snow paddles 23, 23, are in the elevated position they continue to rotate so long as the wheels 18, 18, propel the vehicle. Secured on the rear end portion of the body 12 is a notched arcuate sector plate 31, and cooperating therewith is a conventional latching mechanism 32 carried by the lever 29 and controlled by a handle element 33 carried by said lever. The lever 29 may be locked in any desired position of rotation by means of the locking device 32, whereby the paddle wheels 23, 23 may be locked in either elevated positions or in depressed positions.

It will be seen from Figure 1 that each of the snow paddle wheels 23 is provided with a plurality of vanes 34 which are directed downwardly and forwardly when they engage the ground responsive to the clockwise rotation of the paddle wheels, as viewed in Figure 1. In this manner, when the vehicle is traveling over snow, the vanes 34 not only provide forward propulsion of the vehicle but exert a tamping action on the snow which improves the firmness of the snow track, thereby facilitating the passage of the rear portion of the vehicle over the snow, said rear portion not being illustrated in the drawings but comprising a conventional trailer or similar vehicle body attached to the portion of the vehicle illustrated in the drawings.

Pivotally secured at 35 to each side marginal portion of the frame 12 just ahead of the rear wheel 18 associated with said side marginal portion is a longitudinally extending rudder plate 36 which serves as a guide runner to maintain the vehicle body 12 in a longitudinal direction of movement, and is particularly useful when the vehicle is traveling on a slope where the weight of the vehicle produces a lateral force tending to deviate the vehicle from its intended course of travel. Each of the pivoted runners 36 is formed with a plurality of openings 37 whereby the runners may be secured to the peripheral wall 14 of body 12 in a desired position of angular adjustment around the pivoted connection 35 thereof.

Rotatably supported on the forward portion of the body 12 is a vertical shaft 38 which extends through the bottom wall 13 of the body and has secured thereto a steering runner 39 disposed subadjacent the bottom wall 13, as shown in Figure 1. Secured to the top end of the shaft 38 is a worm gear 40. Meshing with said worm gear 30 is a worm 41 secured on a longitudinally extending shaft 42 rotatably mounted by suitable bracket means on the body 12 and extending into the cab 17. Secured on the end of shaft 42 is a steering wheel 43.

The forward portion of the body 12 is provided at the side marginal portions thereof with upstanding vertically slotted brackets 44 through which extends a transverse bar member 45, said bar member being vertically slidable in the bracket 44 and being formed with opposing ribs 46, 46 slidably engaging in vertical grooves formed in the walls of bracket 44, as shown in Figure 4. Supported above the bar member 45 on the body 12 is a transverse bar member 47 which is rigid with respect to body 12 and which provides a bearing for one end of the shaft 42, as shown at 48. Rotatably supported in the ends of the bar 47 are the depending shafts 49, 49 to which are secured respective steering arms 50, 50. The ends of arms 50 are connected together by a transversely extending drag link bar 51 which is connected by a link bar 52 to a depending pitman arm 53 secured to shaft 42. The lower portions of the depending shaft members 49 are splined, as shown at 54, but extend rotatably through the respective opposite ends of the bar 45. Slidably but non-rotatably engaged on the respective spline portions of the shafts 49 are the respective front wheel shaft brackets 55 which are formed with stub shafts 56 on which are journaled the front wheels 57.

Mounted on the body 12 rearwardly of the transverse bar 45 is an upstanding bracket 58 to which is pivoted a lever 59. The forward end of lever 59 is pivotally connected to the transverse bar member 45 as by a pin 60 slidable in complemental slots 61 formed in ears 62 carried by the bar member 45, Figures 4 and 6, whereby the bar member 45 may be elevated responsive to counter-clockwise rotation of lever 59, as viewed in Figure 1. The bracket 58 is formed with a notched sector portion 60 and the lever 59 carries conventional manually operated latching means engageable with the notched arcuate member 60 to lock the lever 59 in a desired position of angular adjustment around the bracket member 58. By rotating the lever 59 in a clockwise direction, as viewed in Figure 1, the bar member 45 may be lowered relative to the body 12, whereby the front wheels 57 may be employed to support the forward portion of the body 12 on the ground. This enables the vehicle to be employed on a road or on firm ground, to support the vehicle in conjunction with the rear wheels 18, 18, the snow paddles 23, 23 being of course secured in an elevated position. By rotating the lever 59 counter-clockwise, the bar member 45 may be elevated relative to the body 12, lifting the front wheels 57 above the forward portion of the bottom wall 13 of the vehicle body, whereby the front wheels 47 are out of contact with the ground or with the snow on which the vehicle is to be moved. The vehicle may therefore be adapted for use on snow by elevating the front wheels 57 as above described and by lowering the snow paddle wheels 23, 23 by means of the lever 29. The steering wheel 43 is employed to steer both the steering runner 39 and the steerable front wheel assembly above described simultaneously, but, of course, rotation of the steering runner 39 will have no effect on the course of the vehicle when the ground wheels 57, 57 are in lowered positions below the body 12. Conversely, the rotation of the wheels 57, 57 will have no effect on the course of the vehicle when said wheels 57 are in elevated positions above the body 12.

It will be readily apparent that the vehicle may be quickly adjusted for use either as a road vehicle or for use as a snow vehicle by the manipulation of the levers 59 and 29 in the manner above mentioned. The pivoted side runners 36 may be employed to control side drift of the vehicle when it is moving over inclined snow surfaces, as above described, and the degree of control may be regulated by regulating the angular position of said side runners.

While it is desirable to raise the front wheels when the vehicle is adjusted for use as a snow vehicle, since on steering movement these wheels may materially obstruct progress of the vehicle, it is unnecessary to raise the rear wheels, which will sink into the snow and in no way affect the movement of the vehicle.

While a specific embodiment of an improved combination snow and road vehicle has been disclosed in the foregoing description, it will be understood that various modifications within the spirit of the invention may occur to those skilled in the art. Therefore, it is intended that no limitations be placed on the invention except as defined by the scope of the appended claims.

What is claimed is:

1. In a combination snow and road vehicle, a main body, a pair of upstanding brackets arranged adjacent and secured to the front portion of said body, a horizontally disposed bar member extending between and connected to said brackets for vertical up and down movement, a front wheel assembly operatively connected to said bar member, steering means operatively connected to said front wheel assembly, another horizontally disposed bar member overlying and spaced from said first bar member and fixed to said body, a pair of vertical shafts carried by said another bar member and slidably interconnecting with said first named bar member, a steering arm carried by each of said vertical shafts adjacent the upper end and operatively connected to said steering means, another upstanding bracket positioned inwardly of and spaced from said bar member and secured to said body, a lever arranged longitudinally of said body and pivotally connected intermediate its ends to said another bracket, the lower end of said lever being pivotally connected to said bar member, and hand actuated means on the upper end of said lever for effecting the vertical movement of said bar member.

2. In a combination snow and road vehicle, a main body, a pair of upstanding brackets arranged adjacent and secured to the front portion of said body, a horizontally disposed bar member extending between and connected to said brackets for vertical up and down movement, a front wheel assembly operatively connected to said bar member, steering means operatively connected to said front wheel assembly, another horizontally disposed bar member overlying and spaced from said first bar member and fixed to said body, a pair of vertical shafts carried by said another bar member and slidably interconnecting with said first named bar member, a steering arm carried by each of said vertical shafts adjacent the upper end and operatively connected to said steering means, another upstanding bracket positioned inwardly of and spaced from said bar member and secured to said body, a lever arranged longitudinally of said body and pivotally connected intermediate its ends to said another bracket, the lower end of said lever being pivotally connected to said bar member, hand actuated means on the upper end of said lever for effecting the vertical movement of said bar member, and latching means on said lever engageable with means on said another bracket for holding said bar member in its select position of vertical movement.

3. In a combination snow and road vehicle, a main body, a pair of upstanding vertically slotted brackets arranged adjacent and secured to the front portion of said body, a horizontally disposed bar member extending through and connected to the slots of said brackets for vertical up and down movement, each end of said bar member projecting beyond the adjacent bracket, a front wheel assembly operatively connected to the projecting ends of said bar member, steering means operatively connected to said front wheel assembly, another horizontally disposed bar member overlying and spaced from said first bar member and fixed to said body, a pair of vertical shafts carried by said another bar member and slidably interconnecting with said first named bar member, a steering arm carried by each of said vertical shafts adjacent the upper end and operatively connected to said steering means, another upstanding bracket positioned inwardly of and spaced from said bar member and secured to said body, a lever arranged longitudinally of said body and pivotally connected intermediate its ends to said another bracket, the lower end of said lever being pivotally connected to said bar member, hand actuated means on the upper end of said lever for effecting the vertical movement of said bar member, and latching means on said lever engageable with means on said another bracket for holding said bar member in its select position of vertical movement.

References Cited in the file of this patent

UNITED STATES PATENTS

| Number | Name | Date |
|---|---|---|
| 863,633 | Pfeifer | Aug. 20, 1907 |
| 895,721 | Broome | Aug. 11, 1908 |
| 964,151 | Faber | July 12, 1910 |
| 1,251,530 | Hughes | Jan. 1, 1918 |
| 1,320,517 | Wertzler | Nov. 4, 1919 |
| 1,511,331 | Harris | Oct. 14, 1924 |
| 1,552,353 | Shumway | Sept. 1, 1925 |
| 1,637,533 | Pearson | Aug. 2, 1927 |
| 1,682,051 | Pearson | Aug. 28, 1928 |
| 2,051,496 | Sarrazin | Aug. 18, 1936 |
| 2,414,214 | Spackman | Jan. 14, 1947 |

FOREIGN PATENTS

| Number | Country | Date |
|---|---|---|
| 60,230 | Switzerland | May 13, 1912 |
| 117,178 | Great Britain | July 11, 1918 |